(12) United States Patent
Smith et al.

(10) Patent No.: US 11,538,250 B2
(45) Date of Patent: Dec. 27, 2022

(54) SELF-LEARNING GATE PADDLES FOR SAFE OPERATION

(71) Applicant: Cubic Corporation, San Diego, CA (US)

(72) Inventors: Gavin R. Smith, Crawley (GB); Steffen Reymann, Guildford (GB); Jonathan Packham, Ashford (GB)

(73) Assignee: Cubic Corporation, San Diego, CA (US)

(*) Notice: Subject to any disclaimer, the term of this patent is extended or adjusted under 35 U.S.C. 154(b) by 188 days.

(21) Appl. No.: 17/152,504

(22) Filed: Jan. 19, 2021

(65) Prior Publication Data

US 2021/0224552 A1 Jul. 22, 2021

Related U.S. Application Data

(60) Provisional application No. 62/962,454, filed on Jan. 17, 2020.

(51) Int. Cl.
*G06V 20/52* (2022.01)
*G06K 9/62* (2022.01)
*G06N 3/08* (2006.01)
*G06Q 10/02* (2012.01)
*G06Q 50/30* (2012.01)

(52) U.S. Cl.
CPC ............ *G06V 20/52* (2022.01); *G06K 9/6256* (2013.01); *G06N 3/08* (2013.01); *G06Q 10/02* (2013.01); *G06Q 50/30* (2013.01)

(58) Field of Classification Search
None
See application file for complete search history.

(56) References Cited

U.S. PATENT DOCUMENTS

| | | | |
|---|---|---|---|
| 6,528,961 B1 | 4/2003 | Fitzgibbon et al. | |
| 2009/0116903 A1 | 5/2009 | Causey et al. | |
| 2019/0220656 A1* | 7/2019 | Kayhani | ............... G06V 40/20 |
| 2020/0410792 A1* | 12/2020 | Romero | ............... G01S 13/887 |
| 2021/0209883 A1* | 7/2021 | Arrufat Ribas | .......... G07C 9/15 |

FOREIGN PATENT DOCUMENTS

| | | |
|---|---|---|
| WO | 2012/017266 A1 | 2/2012 |
| WO | 2019/028016 A1 | 2/2019 |

* cited by examiner

*Primary Examiner* — Leon Flores
(74) *Attorney, Agent, or Firm* — Kilpatrick Townsend & Stockton LLP

(57) ABSTRACT

A system and method for self-learning operation of gate paddles is disclosed. Opening and closing of the gate paddles requires timing and other settings to avoid injury and fare evasion. Self-learning allows a machine learning model to adapt to new data dynamically. The new data captured at a fare gate improves the machine learning model, which can be shared the other similar fare gates within a transit system so that learning disseminates.

20 Claims, 7 Drawing Sheets

SELF-LEARNING GATE PADDLES FOR SAFE OPERATION

This application claims the benefit of and is a non-provisional of U.S. Provisional Application Ser. No. 62/962,454 filed on Jan. 17, 2020, which is hereby expressly incorporated by reference in its entirety for all purposes.

BACKGROUND

This disclosure relates in general to transportation fare gates and, but not by way of limitation, to updating operation of the paddles/gates/barriers that impedes transit users who have not complied with fare requirements.

Transportation fare gates are used in mass transit systems. Such fare gate systems provide for the entry and exit for riders to control access and regulate fare compliance. A fare gate consists of one or more gate paddle each driven by a motor and controlled by electronics and software. The gate paddles configuration could be alone or in pairs that could swing toward/away or up/down to impede passenger traffic. Paddles are operated by the fare gate with each paddle having a wing or flap mechanism allowing for opening and closing in order to allow riders to either enter or exit the transit system. Paddles open and close allowing a time duration for riders to pass through the fare gate.

The speed that the paddles open and close are general programmable along with torque values that resist any obstruction as the paddles move. Typically, there is a service technician that manually adjusts the torque values that can affect speed of the paddles and their resistance to movement. The age of the mechanism or weight of the paddles can change the speed of movement for a given torque setting for the motor. Different firmware, different components and their age and other configuration can also affect the operation. A given transit system may have thousands of gates having many different configurations or profiles.

SUMMARY

In one embodiment, the present disclosure provides a system and method for self-learning operation of gate paddles. Opening and closing of the gate paddles requires timing and other settings to avoid injury and fare evasion. Self-learning allows a machine learning model to adapt to new data dynamically. The new data captured at a fare gate improves the machine learning model, which can be shared the other similar fare gates within a transit system so that learning disseminates.

In another embodiment, the present disclosure provides a self-learning gate system that automatically adjusts for transit users. The self-learning system includes sensors, a processor, a barrier, and a barrier actuator. The sensors are configured to capture sensor data for the transit users. Input data is formed using the sensor data for the transit users. The processor is configured to execute a machine learning model that generates control data based on the input data. The control data includes instructions for a desired movement of the barrier to pass the transit users. The barrier actuator is coupled to the barrier and configured to cause movement of the barrier based on the control data bounded by predetermined operating guidelines for the barrier. The machine learning model is trained using the input data for different type of transit users, and a comparison between the desired movement of the barrier and an actual movement of the barrier for different transit users.

In another embodiment, the present disclosure provides a method for implementing a self-learning fare gate system. In one step, first sensor data is captured using one or more sensors for a first transit user. Input data is formulated from the first sensor data. First control data is generated using a machine learning model based on the first input data. The first control data includes ibnstructions for a desired movement of a barrier of a fare gate. The first control data is sent to a barrier actuator to cause a desired movement of the barrier. Actual movement of the barrier is determined to not match the desired movement. Training data is formed based on a comparison between the desired movement of the barrier and the actual movement of the barrier. The machine learning model is trained using the training data. Second sensor data is captured using the one or more sensors for a second transit user. Second input data is formed from the second sensor data. Second control data is generated using the machine learning model based on the first input data. The second control data is different from the first control data.

In yet another embodiment, the present disclosure provides software for a self-learning gate system that automatically adjusts for transit users. The software performs the following functions:
  capturing first sensor data using one or more sensors for a first transit user;
  forming input data comprising the first sensor data;
  generating first control data using a machine learning model based on the first input data, wherein the first control data includes instructions for a desired movement of a barrier of a fare gate;
  sending the first control data to a barrier actuator to cause a desired movement of the barrier, wherein the barrier actuator is coupled to the barrier;
  determining actual movement of the barrier did not match the desired movement;
  forming training data based on a comparison between the desired movement of the barrier and the actual movement of the barrier;
  training the machine learning model using the training data;
  capturing second sensor data using the one or more sensors for a second transit user;
  forming second input data comprising the second sensor data; and
  generating second control data using the machine learning model based on the first input data, wherein the second control data is different from the first control data.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
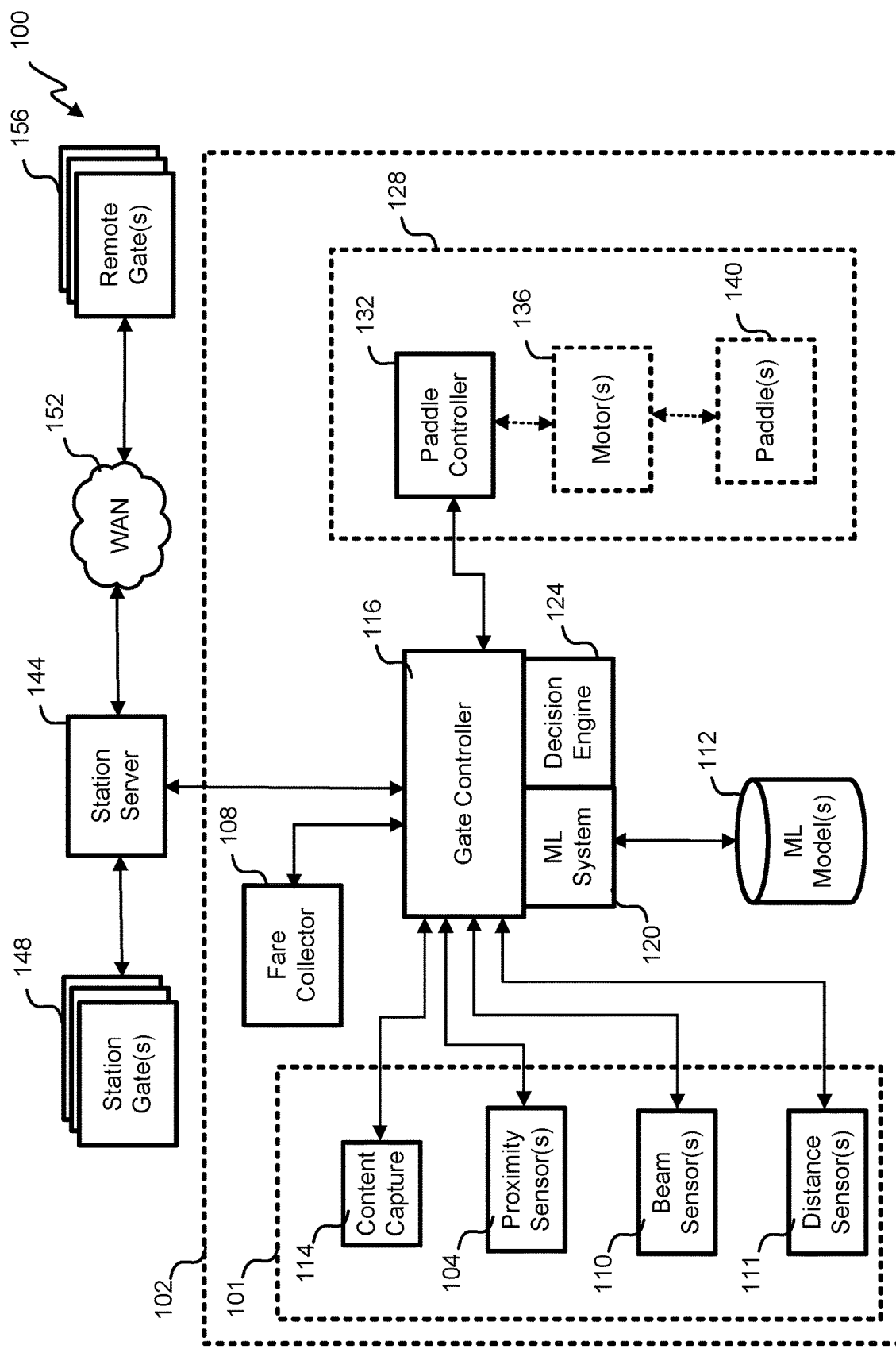
FIG. 1 depicts a block diagram of an embodiment of a gate system that utilizes machine learning models.

In the appended figures, similar components and/or features may have the same reference label. Where the reference label is used in the specification, the description is applicable to any one of the similar components having the same reference label.

DETAILED DESCRIPTION

Embodiments described herein are generally related to enabling gate systems to "learn" safe operation by not closing when passengers or objects are within the zone of operation where they might be injured or at least inconvenienced. That said, a person of ordinary skill in the art will understand that alternative embodiments may vary from the embodiments discussed herein, and alternative transit applications may exist (e.g., on taxis, airports, ferries, trains, etc.).

Embodiments described herein increase overall safety of gate systems, increase throughput (e.g., by not jamming bags in the paddles), and increase passenger satisfaction when using the gate systems. In some embodiments, patterns can be learned that lead to the forcing open of gate paddles (e.g., fare evasion) and the gate system can start to anticipate this behavior and alert staff or sound an alarm or adapt to avoid interference. In some embodiments, various sensor data captured and/or detected within and around the gate can be used to query a machine learning (ML) system to determine whether the paddles should be opened or closed. In one example, just prior to the actual paddle being opened, the ML system can be queried to receive a probability if the paddle opening or closing with the current configuration is likely to hit the passenger as they pass through. Once the passenger has passed through (either successfully or being jammed), the gate sends the tracking data together with the outcome (success/jam) back into the ML decision engine which uses it to continually train.

The paddle control subsystem can act independently or in conjunction with the passenger tracking subsystem. For example, the paddle control subsystem can rely on its own local sensors to determine whether it is safe to open or close or, in some embodiments, the paddle control subsystem can utilize data from the tracking system. In one example, if a paddle encountered force event is detected, tracking data captured by the passenger tracking subsystem can be sent to the ML decision engine (together with a "fare evasion" categorization), which can be used to predict these events happening in the future.

Many benefits can be achieved by way of the the various embodiments including, but not limited to, (1) the gate system can learn from successful and unsuccessful closures and openings to optimize future performance, (2) a ML system can be used and trained on sensor data and paddle closure data from single or multiple fare gates, (3) the gate system is independent of gate sensor technology and sensors can be external to the fare gate (e.g., CCTV cameras), (4) the gate system can be retrofitted to existing fare gates, and (5) the ML systems and databases can be local to a station or be remote (e.g., cloud).

Referring initially to FIG. 1, a block diagram showing an embodiment of a gate system 100 that utilizes machine learning models 112 is shown. A fare collector 108 reads tickets and fare cards to collect and check fare compliance for a gate controller 116. The fare collector 108 determines fare compliance with insertion of cash, reading a fare card or touchless with a radio frequency identification (RFID) card and allows the rider to pass through a chosen fare gate by opening the paddles, gates or barriers.

A passenger tracking subsystem 101 tracks riders as they approach and interact with a fare gate 102. The passenger tracking subsystem 101 detects moving objects and may provide contactless passage through the fare gate 102 when the transit user holds a valid digital ticket, fare card, or e-ticket. Input data are captured by the passenger tracking subsystem 101 that includes content capture device(s) 114 such as image capture and video capture camera, proximity sensors 104 such as capacitive sensors, beam sensor(s) 110 such as laser scanners, and distance sensors 111 such as ultrasonic sensors.

Each fare gate 102 can utilize machine learning (ML) with a ML system 120, decision engine 124, and ML models 112. The ML model 112 is being used and trained concurrently during normal operation of fare gate 102. A gate controller 116 uses the ML system 120 to control a decision engine 124 that generates and sends instructions to a paddle control subsystem 128. Within the paddle control subsystem 128 are a paddle controller 132, a motor(s) 136, and a paddle(s) 140 that work together to control movement of the paddle 140 and at what speed. The motor 136 engages a barrier actuator (not shown) to move open or closed the paddle 140 allowing riders to either pass or not through the fare gate 102. In various embodiments, ML models 112 may be based upon any number of different machine learning algorithms including artificial intelligence, convolution machine learning, a recurrent machine learning, and/or an long short-term memory (LSTM) network.

The ML system 120 may include various nodes and layers for providing an output (e.g., control data from the decision engine 124) based on the processing of a number of inputs (e.g., data from the passenger tracking subsystem 101 and fare collector 108, etc.). Rider detection uses data gathered by beam sensors 110, proximity sensors 104, distance sensors 111, and/or content capture device 114. The fare collector 108 captures ticket data may include an indication of whether the transit user has paid the fare and/or whether the transit user has validated for entry into the transit system. Ticket data may further indicate the type of payment (cash, credit, transit pass, fare exemption, etc.), fare rules and authorizations, and/or an identity of the passenger. For example, the ticket data may provide an identifier associated with the transit user such that ML models 112 may incorporate certain data regarding the transit user (e.g., speed, age, size, stride, etc.) for input into the ML system 120. The passenger tracking subsystem 104 can be used with data from the fare collector 108 to automatically determine fare evasion that can be used to train the ML model 112.

Environmental data is used by the ML model 120 in some embodiments. For example, environmental data may include the current time; the current day of the week; an indication of whether it is a holiday, weekend or work day; the current weather; the location of the gate; the type of location of the gate (e.g., entrance to the train station that connects to the airport), and the like.

Control data generated by gate controller 116 is based on the ML model 112 and may include instructions for controlling paddles 140, for example, instructions for the paddles 140 to move to an open position or to a closed position. The ML model 112 may include a probability that an object would be positioned between barriers 104 such that closing the barriers would cause the barriers to hit the object. Based on the probability, the decision engine 124 instructs the paddle controller 132 to move the paddles 140 to the open or closed position (e.g., based on comparing the probability to a threshold). In some embodiments, control data from the decision engine 124 may include a speed at which barrier actuator is to close or open the paddles 140. For example, control data may include an angular rate, motor torque and/or a linear velocity at which barrier actuator is to move to close or open paddles 140.

During the operation of the fare gate 102 feedback is received from the paddle control subsystem 128 to compute training data to train the ML model 112 to improve over time. For example, if control data includes instructions for barrier actuator to move paddles 140 to a closed position, and paddle data returned indicates that paddle 140 did not successfully move to the closed position. Training data to the ML model 112 may indicate the error such as, for example, indicating a difference between the actual position of paddles 140 and the desired position of the paddles 140. As another example, if control data includes instructions for barrier actuator to move paddles 140 to a closed position, and barrier data indicates that paddles 140 successfully moved to the closed position, then training data may indicate that control data performed normally.

In some embodiments, ML system 120 may be modified based on a new ML model 112 from another fare gate such as another station gate 148 or even a remote gate 156 from another station. ML models 112 are developed for different configurations of fare gates 102, but can be shared over a WAN 152 through a station server 144. Similarly, training data from other fare gates 102 can be shared. For example, ML system 120 may be modified upon receiving each new set of training data during operation of a remote gate 156. In some instances, the weights associated with one or more nodes or layers of ML system 120 may be modified. In some instances, the magnitude of the modification to ML system 120 may be proportional (or related) to the magnitude of the error indicated by training data. For example, when error calculation determines that the actual and desired positions of barrier 104 are the same or similar, little if no modifications may be made to ML model 112. As another example, when the error calculator determines that the actual and desired positions of paddle 140 differ, greater modifications may be made to the ML model 112.

The chosen ML model 112 chosen for the fare gate 102 may be location specific or may be used globally across a gate system 100 for similarly configured fare gates 102. For example, each individual station within a transit system may maintain a location-specific ML model 112 that is trained only using the input data (e.g., sensor data) gathered by fare gates 102 in the same station. As another example, various gate systems 100 and transit systems may provide training data to globally-shared ML models 112. In some instances, copies of the globally-shared ML models 112 may be downloaded onto specific gates on a daily or periodic basis such that control data can be quickly updated for each fare gate 102 with learning from across the gate system 100. In some embodiments, the globally-shared ML models 112 may receive input data from remote gates over a wired and/or wireless communication WAN 152 and in response the generated control data may be provided over the same communication interface.

Figure 2:
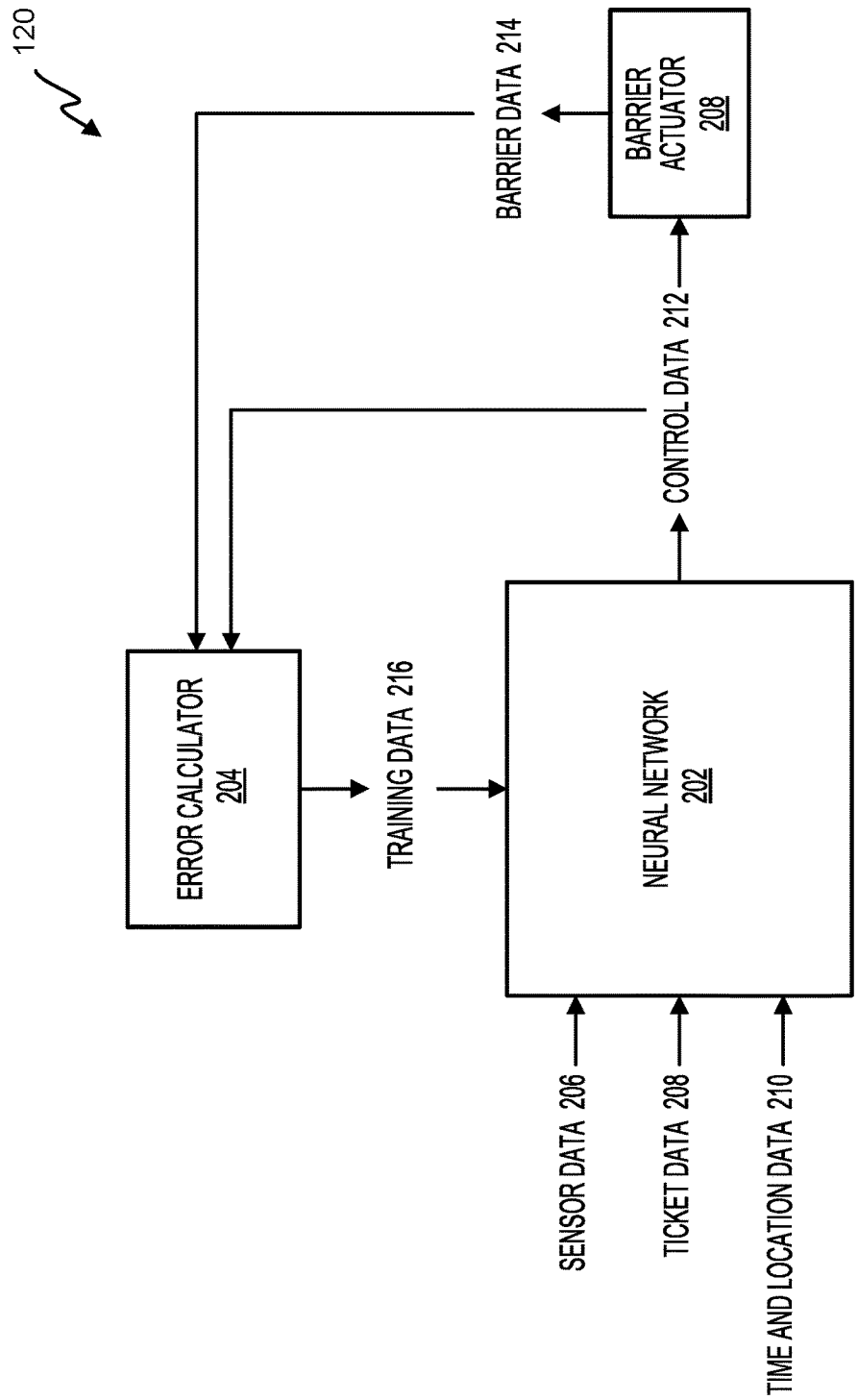
FIG. 2 depicts a block diagram of an embodiment of a ML system operating within a fare gate.

FIG. 2 illustrates a block diagram showing how the ML system 120 operates within a fare gate 102 in an embodiment. The ML system 120 uses a neural network 202. In some embodiments, fare gate 102 can utilize neural network 202 in a way that neural network 202 is being used and trained concurrently during normal operation of fare gate 102. In various embodiments, neural network 202 may be any of a number of different ML systems, such as an artificial neural network, a convolutional neural network, a recurrent neural network, an LSTM network, and the like.

Neural network 202 may include various nodes and layers for providing an output (e.g., control data 212) based on the processing of a number of inputs (e.g., sensor data 206 from the passenger tracking system 104, ticket data 208 from the fare collector 108, time and location data 210, etc.). Sensor data 206 may include data gathered by beam sensors 110, proximity sensors 104, distance sensors 111, and/or content capture device 114. Ticket data 208 may include an indication of whether the transit user has paid the fare and/or whether the transit user has validated for entry into the transit system. Ticket data 208 may further indicate the type of payment (cash, credit, transit pass, etc.) and/or an identity of the passenger. For example, the ticket data may provide an identifier associated with the transit user such that neural network 502 may incorporate certain data regarding the transit user (e.g., speed, size, stride, etc.) for using and training neural network 202.

Time and location data 210 may include various information regarding the time at which the transit user enters through the gate as well as information regarding the location of the gate. For example, time and location data 210 may include the current time, the current day of the week, an indication of whether it is a holiday or work day, the current weather, the location of the gate, the type of location of the gate (e.g., entrance to train station that connects to airport), and the like.

Control data 212 may include instructions for controlling barrier actuator 208 such as, for example, instructions for barrier actuator 208 to move to an open position or to a closed position. Control data 212 may optionally indicate whether paddles 140 should be in the open or closed position and/or provide a probability or likelihood associated with the determination. In some embodiments, control data 212 may include a probability that an object is positioned between paddles 140 such that closing the paddles would cause the paddles to hit the object. Based on the probability, barrier actuator 208 can be caused to move to the open or closed position (e.g., based on comparing the probability to a threshold). In some embodiments, control data 212 may include a speed at which barrier actuator 208 is to close or open paddles 140. For example, control data 212 may include an angular rate and/or a linear velocity at which barrier actuator 208 is to move to close or open barriers 140.

During operation of gate system 100, an error calculator 204 may receive control data 212 from neural network 202 and barrier data 214 from barrier actuator 208 and may compute training data 216 based on the received data. For example, if control data 212 includes instructions for barrier actuator 208 to move paddles 140 to a closed position, and barrier data 214 indicates that paddles 140 did not successfully move to the closed position, then training data 216 may indicate the error such as, for example, indicating a difference between the actual position of paddles 140 and the desired position of the paddles 140. As another example, if control data 212 includes instructions for barrier actuator 208 to move paddles 140 to a closed position, and barrier data 214 indicates that paddles 140 successfully moved to the closed position, then training data 216 may indicate that control data 212 was accurate based on the input data received by the neural network 202.

In some embodiments, neural network 202 may be modified based on training data 216. For example, neural network 202 may be modified upon receiving each new set of training data during operation of gate system 100. In some instances, the weights associated with one or more nodes or layers of neural network 202 may be modified. In some instances, the magnitude of the modification to neural network 202 may be proportional (or related) to the magnitude of the error indicated by training data 216. For example, when error calculator 204 determines that the actual and desired positions of paddles 140 are the same or similar, little if no modifications may be made to neural network 202. As another example, when error calculator 204 determines that the actual and desired positions of paddles 140 differ, greater modifications may be made to neural network 202.

In various embodiments, neural network 202 may be location specific or may be used globally across a transit system. For example, each individual gate system 100 within a transit system may maintain a location-specific neural network 202 that is trained only using the input data (e.g., sensor data 206) gathered by that specific fare gate 102. As another example, various gate systems 100 throughout a transit system may provide training data 216 to a globally-shared neural network 202. In some instances, copies of the globally-shared neural network may be downloaded onto specific gates 102 on a daily or periodic basis such that control data 212 can be quickly generated at each fare gate 102. In some embodiments, the globally-shared neural network may receive input data from remote gate systems over the WAN 152 and in response the generated control data 212 may be provided over the same communication interface.

Figure 3:
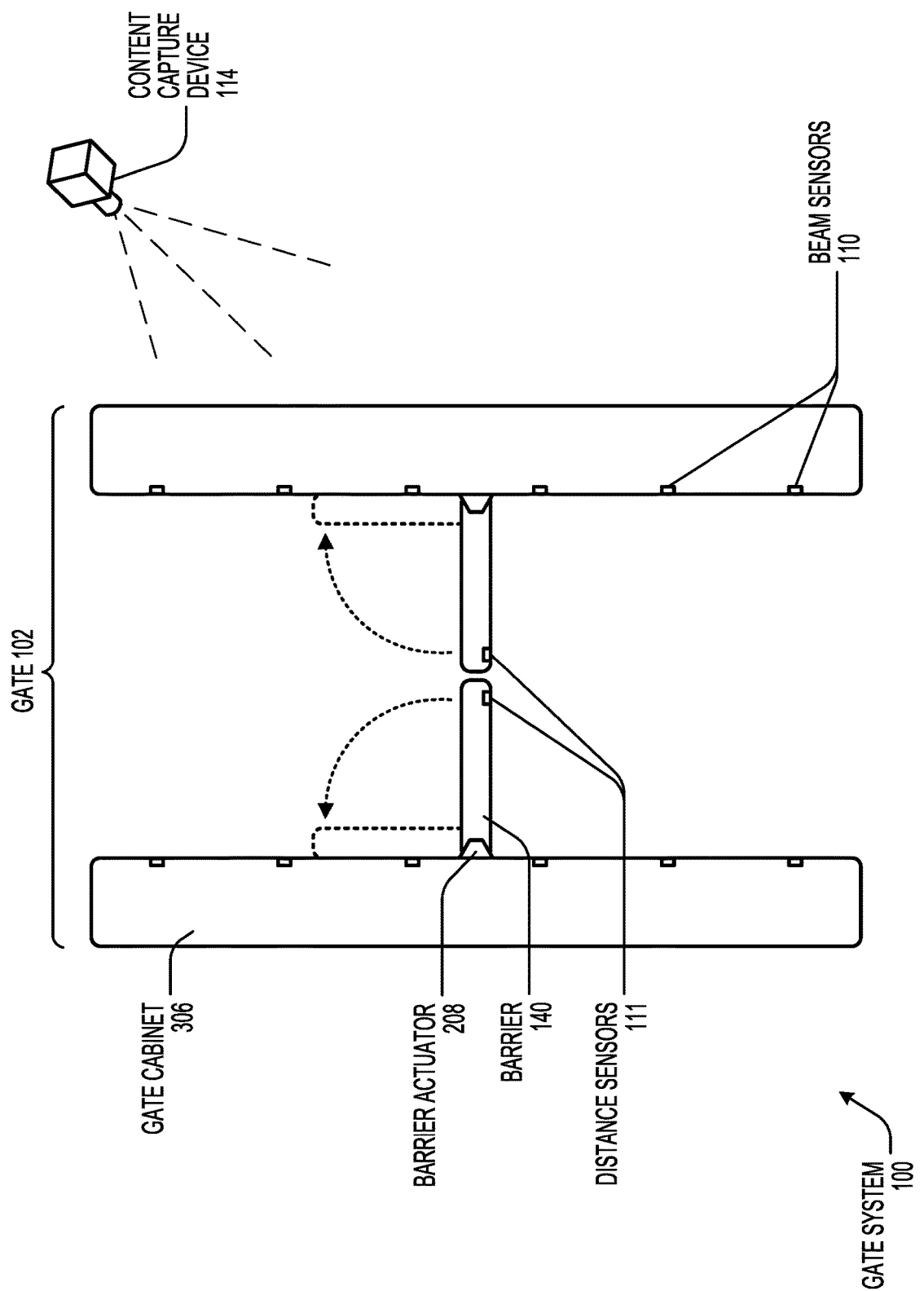
FIG. 3 depicts a diagram of an embodiment of a gate system that includes a fare gate.

FIG. 3 illustrates an embodiment of a gate system 100 including a fare gate 102, which may correspond to an access control point within a transit system. Fare gate 102 may separate a restricted access area from a non-restricted access area within the transit system. Examples of the restricted access area may include a transportation platform (e.g., bus platform, train platform, etc.), the inside of a transportation station (e.g., bus station, train station, etc.), the inside of a transit vehicle (e.g., bus, train, etc.), the inside of a building, the inside of a concert venue, and the like. Gate 102 may include a single or a pair of barriers or paddles 140 that may be retractable or rotatable so as to move between an open position and a closed position. In the illustrated embodiment, each of barriers 140 can be closed by rotating the barrier until it becomes parallel with one of a set of gate cabinets 306. In some embodiments, a barrier actuator 208 coupled to barrier 140 may cause barrier 140 to move between the open and closed positions.

In some embodiments, barrier actuator 208 may be a rotary actuator, such as a servo motor, that allows precise control of angular position, angular rate, and/or angular acceleration. For example, barrier actuator 208 may include both a rotary actuator and a sensor that provides feedback of the current angular position of barrier actuator 208, from which the position of barrier 140 can be determined. In some embodiments, barrier actuator 108 may be a linear actuator that allows precise control of linear position, linear velocity, and/or linear acceleration. For example, barrier actuator 208 may include both a linear actuator and a sensor that provides feedback of the current linear position of barrier actuator 208, from which the position of barrier 140 can be determined.

Gate system 100 may include various sensors for generating sensor data that is used by gate system 100. For example, gate system 100 may include beam sensors 110, distance sensors 111, and a content capture device 114. Beam sensors 110 may be coupled to the inner surfaces of gate cabinets 106 and may comprise pairs of infrared (IR) transmitter/receiver beam sensors that detect the presence of objects between the sensors along the passageway formed by gate 102.

Distance sensors 111 may be coupled to barriers 140 and may be oriented in the direction of incoming transit users so as to detect the distance between the transit users and barriers 140 as the transit users approach barriers 140. Distance sensors 111 may employ any of a number of technologies capable of detecting a distance, such as a capacitive sensor, an inductive sensor, an ultrasonic sensor, a LIDAR sensor, a laser rangefinder, a radar sensor, and the like.

Content capture device 114 may capture still images and/or video of the fare gate 102 and its surroundings. In some embodiments, content capture device 114 is a camera having a field of view covering at least part of fare gate 102. For example, content capture device 114 may be positioned above fare gate 102 and oriented downwards so as to cover fare gate 102 from a top-down view.

Figure 4:
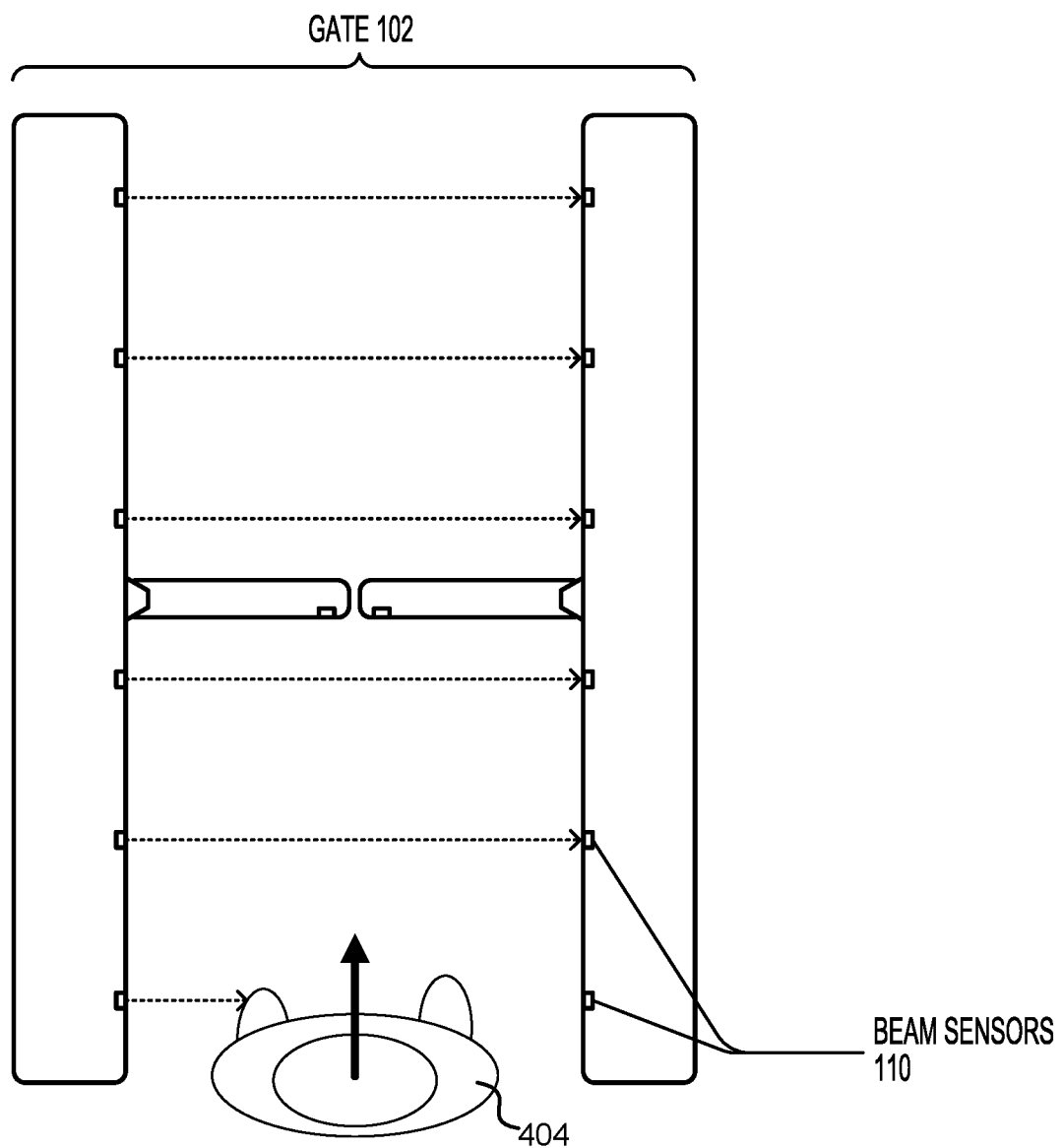
FIG. 4 depicts a diagram of an embodiment of beam sensors when encountering a transit user.

FIG. 4 illustrates an example of the functionality of beam sensors 110 when encountering a transit user, passenger or rider 404. In the illustrated example, beam sensors 110 located on the left gate cabinet comprise transmitters and beam sensors 110 located on the right gate cabinet comprise receivers, each of which is paired with one of the transmitters. Which one of the receivers fails to receive the transmitted beam, the fare gate 102 can determine that an object is present between the receiver and the corresponding transmitter. The time at which an object is detected by one pair of beam sensors 110 can be compared to other times detected by other pairs of beam sensors 110, which allows fare gate 102 to determine the position and velocity of transit users 404.

Figure 5:
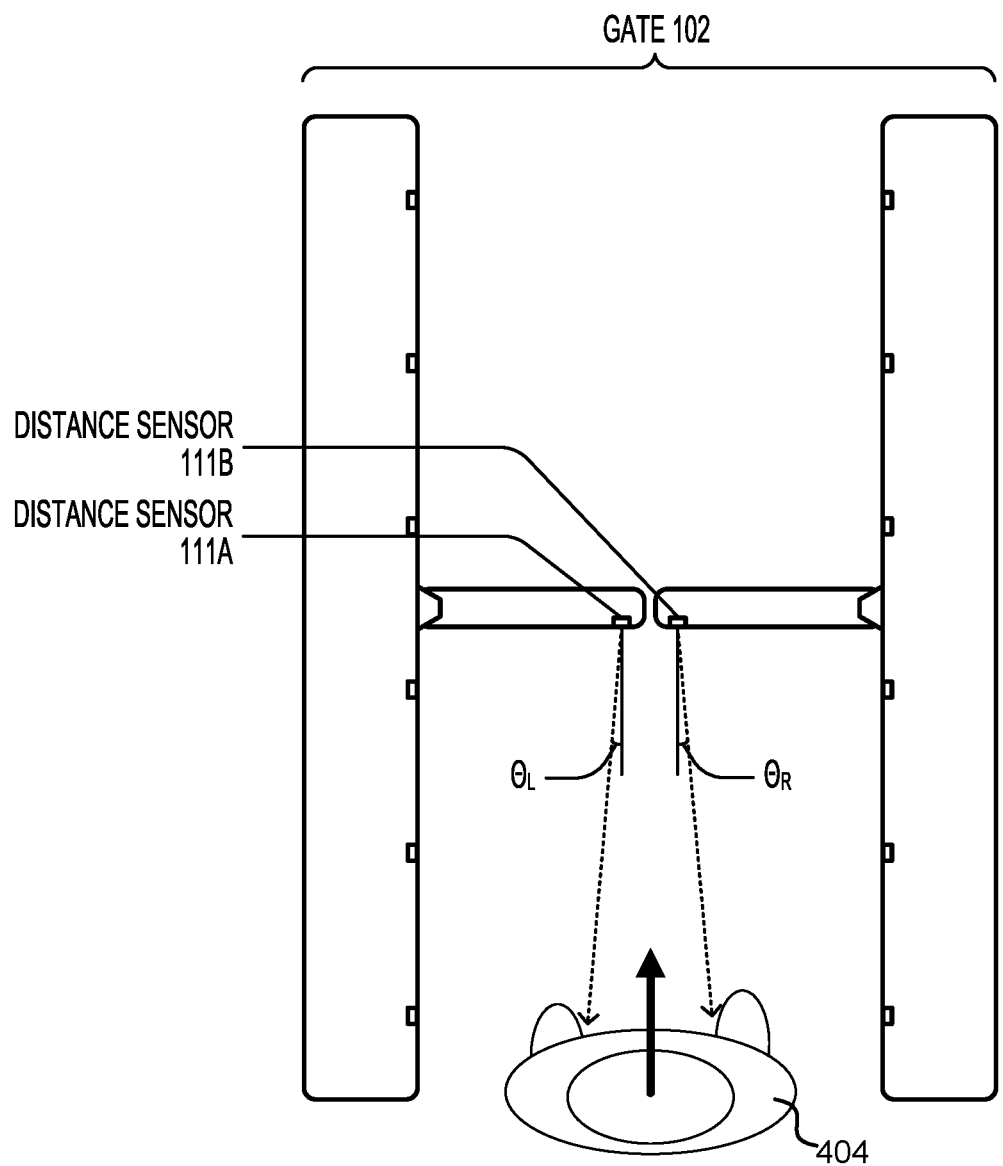
FIG. 5 depicts a diagram of an embodiment of distance sensors interacting with a transit user.

FIG. 5 illustrates an example of the functionality of distance sensors 111 for one embodiment. In the illustrated example, distance sensors 111 are attached to and/or integrated with barriers 140 and are oriented in the general direction of the transit user 404 approaching the barriers. Specifically, a left distance sensor 111A has an orientation that is offset by θL from a line that is perpendicular to barriers 140 and/or is parallel to gate cabinets 106 and a right distance sensor 111B has an orientation that is offset by θR from a line that is perpendicular to barriers 140 and/or is parallel to gate cabinets 106. In various embodiments, orientations θL and θR can vary between −45 and +45 degrees. In some embodiments, distance sensors 111 can be oriented directly perpendicular to barriers 140 and/or parallel to gate cabinets 106 (e.g., θL and θR equal to 0 degrees).

Figure 6:
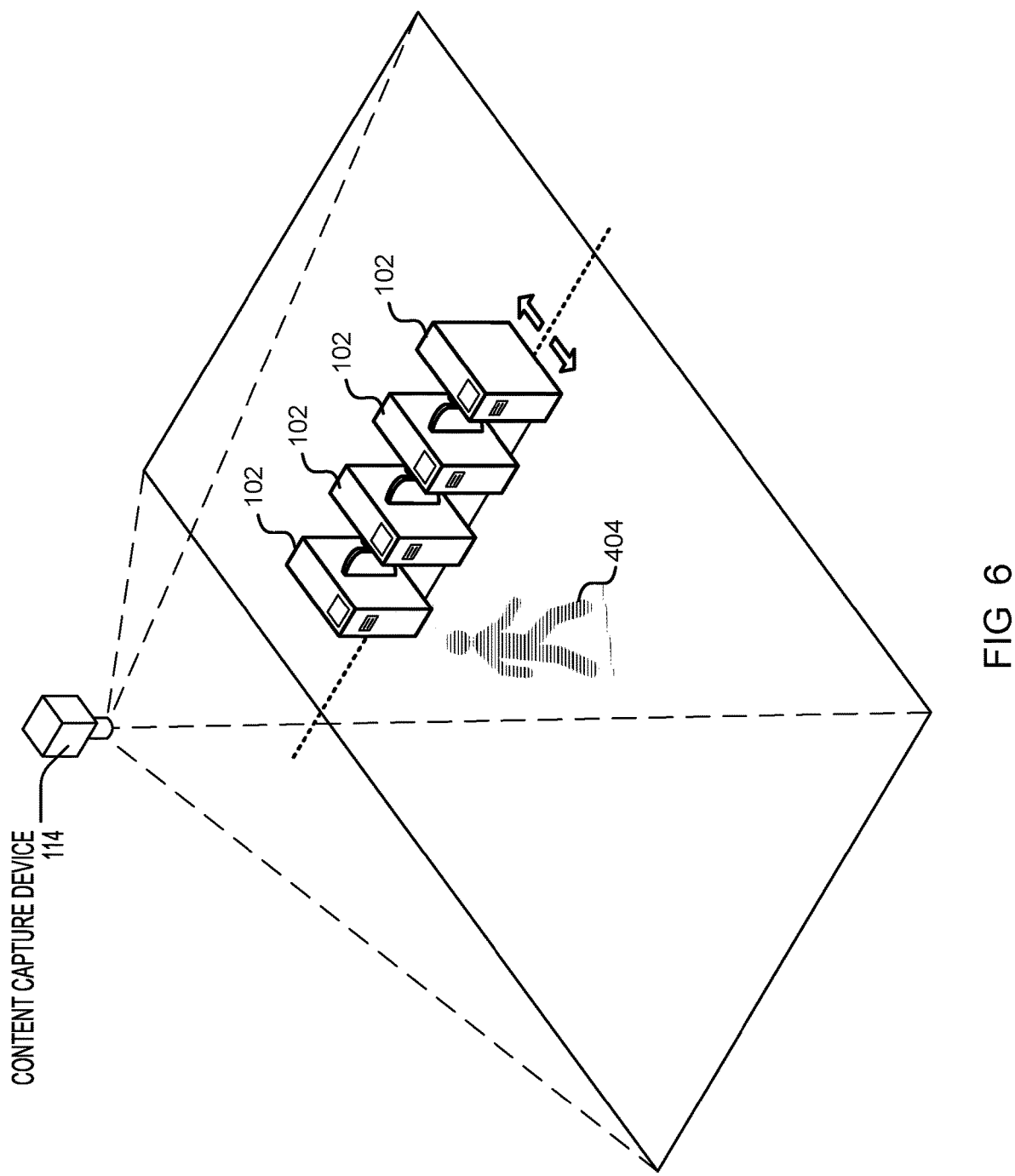
FIG. 6 depicts a diagram of an embodiment of a three dimensional view of a content capture device focused on fare gates with an approaching transit user.

FIG. 6 illustrates one embodiment of a three dimensional view of the content capture device 114 focused on an image of a set of fare gates 102 as a transit user 404 approaches. The content capture device 114 is mounted overhead and pointed toward the set of station gates 148. The field of view of the content capture device 114 that covers the set of gates 102. When the transit user 404 is within the image view of the content capture device 114 to either enter or exit the gates 102, then the gate system 100 can analyze the transit user 404 to categorize or profile how they may interact with the gate 102. The ML model 112 is adjusted accordingly for the particular transit user 404.

Figure 7:
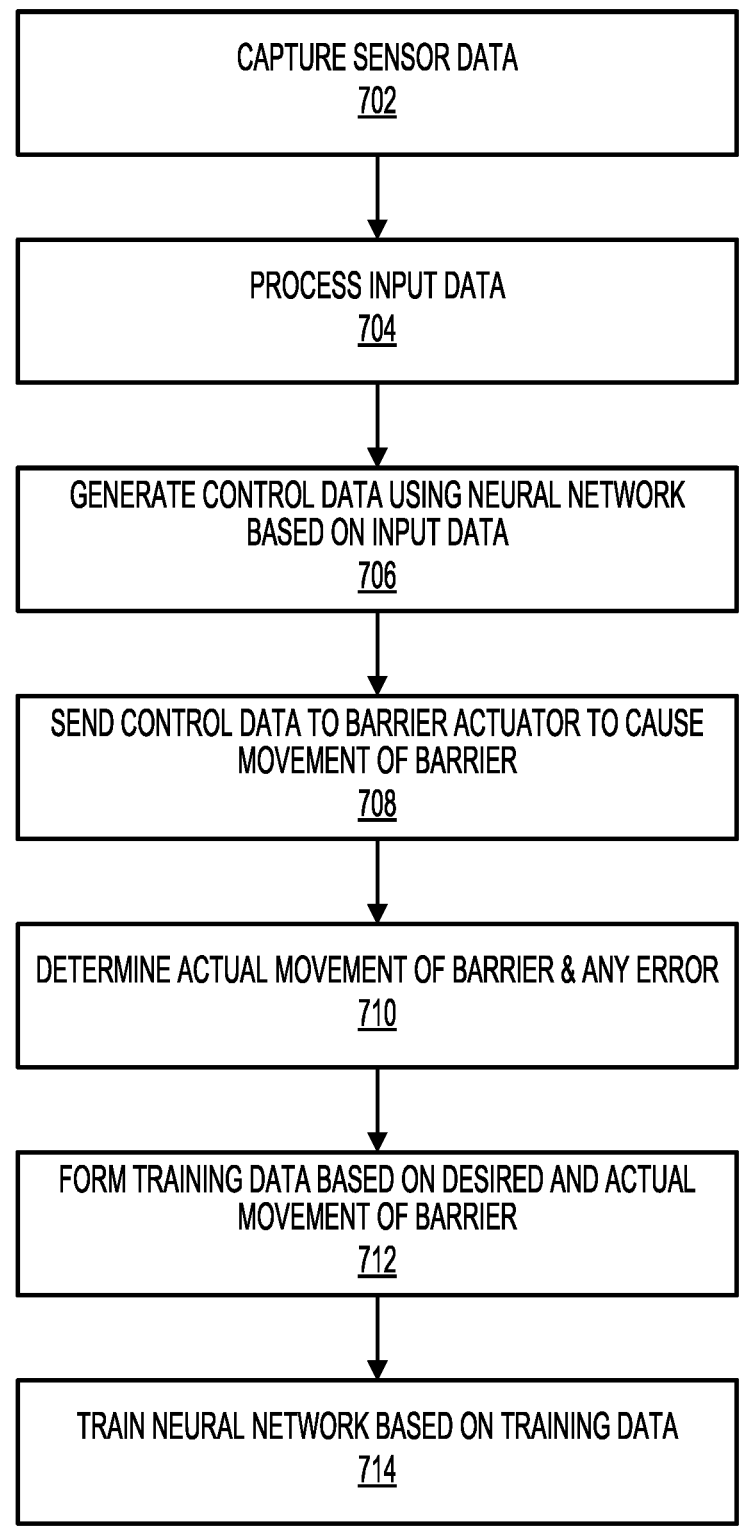
FIG. 7 illustrates a flowchart of an embodiment of a process for operation of a gate system that uses machine learning.

FIG. 7 illustrates an is a flow diagram 700 of a gate system 100 that uses ML according to an embodiment. The depicted part of the process begins at block 702, where data captured by the content capture device 114, proximity sensors 104, beam sensors 110 and distance sensors 111 along with information from the fare collector 108 are collated in order to form an input data in block 704. Age, weather, station patterns, and time of travel of the transit user 404 are among the considerations in forming input data in block 704.

The ML system 120 receives the input data and generates a set of control data 212 in block 706 and sends to the barrier actuator 208 and error calculator 204. Control data 212 received by the barrier actuator 208 to cause barrier movement of the barrier 140 in block 708 in order to allow the transit user 404 through the fare gate 102. Based upon information from the passenger tracking subsystem 104 or fare collector 108, the barrier 140 timing might be adjusted or prevent opening the barrier 140 altogether.

In block 710, the actual movement of the barrier is determined and produce an error signal and send to the error calculator 204 should the barrier 104 meet an obstruction. Error calculator 204 forms a part of a training data 216 in block 712 to improve the ML model 112 to adapt to different circumstances. In block 714, the training data 216 acquired improves the ML model 112. Some embodiments send to the station server 114 improvements to the ML model 112 for sharing with remote gates 156 and station gates 148 having similar configuration to the present fare gate. When the ML model 112 is updated, some embodiments lower the torque to the motor 136 for the paddle 140 until a predetermined number of successful uses of the fare gate 102 occur.

A number of variations and modifications of the disclosed embodiments can also be used. For example, the ML model may be each fare gate, but in other embodiments the ML system could run the ML model in the station server or even away from the station altogether.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data. These machine-readable instructions may be stored on one or more machine-readable mediums, such as CD-ROMs or other type of optical disks, solid-state drives, tape cartridges, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of" the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art. While the principles of the disclosure have been described above in connection with specific apparatuses and methods, it is to be clearly understood that this description is made only by way of example and not as limitation on the scope of the disclosure.

What is claimed is:

1. A self-learning gate system that automatically adjusts for transit users, the self-learning system comprising:
   a plurality of sensors configured to capture sensor data for the transit users, wherein input data is formed using the sensor data for the transit users;
   a processor configured to execute a machine learning model that generates control data based on the input data;
   a barrier, wherein the control data includes instructions for a desired movement of the barrier; and
   a barrier actuator coupled to the barrier and configured to cause movement of the barrier based on the control data bounded by predetermined operating guidelines for the barrier,
   wherein the machine learning model is trained using:
      the input data for different type of transit users, and
      a comparison between the desired movement of the barrier and an actual movement of the barrier for different transit users.

2. The self-learning gate system that automatically adjusts for transit users of claim 1, wherein the input data further comprises fare terms for the transit users.

3. The self-learning gate system that automatically adjusts for transit users of claim 1, wherein the input data further comprises time and location data of the transit users.

4. The self-learning gate system that automatically adjusts for transit users of claim 1, wherein the input data further comprises location information of the transit users approaching the barrier.

5. The self-learning gate system that automatically adjusts for transit users of claim 1, wherein different type of transit users generate different control data unique to themselves.

6. The self-learning gate system that automatically adjusts for transit users of claim 1, wherein the input data further comprises environmental data comprising at least one of the weather data and station traffic.

7. The self-learning gate system that automatically adjusts for transit users of claim 1, wherein torque applied to the barrier is limited after changes in the machine learning model.

8. A method for implementing a self-learning fare gate system, the method comprising:
   capturing first sensor data using one or more sensors for a first transit user;
   forming input data comprising the first sensor data;
   generating first control data using a machine learning model based on the first input data, wherein the first control data includes instructions for a desired movement of a barrier of a fare gate;
   sending the first control data to a barrier actuator to cause a desired movement of the barrier, wherein the barrier actuator is coupled to the barrier;
   determining actual movement of the barrier did not match the desired movement;
   forming training data based on a comparison between the desired movement of the barrier and the actual movement of the barrier;
   training the machine learning model using the training data;
   capturing second sensor data using the one or more sensors for a second transit user;
   forming second input data comprising the second sensor data; and
   generating second control data using the machine learning model based on the first input data, wherein the second control data is different from the first control data.

9. The method for implementing the self-learning gate system of claim 8, wherein the first input data further comprises fare ticket data for the first transit user.

10. The method for implementing the self-learning gate system of claim 8, wherein:
    the first and second control data defines timing for opening and closing the barrier, and
    timing of the barrier movement for the first user is different from the second user.

11. The method for implementing the self-learning gate system of claim 8, wherein the first input data further comprises account information for the first transit user.

12. The method for implementing the self-learning gate system of claim 8, wherein determining the actual movement of the barrier includes:
  generating barrier data with a sensor coupled to the barrier actuator, wherein the barrier data is indicative of the actual movement of the barrier.

13. The method for implementing the self-learning gate system of claim 8, wherein the machine learning model further comprises a neural network.

14. The method for implementing the self-learning gate system of claim 8, where the second control data sent to the barrier actuator is torque limited after changes in the machine learning model.

15. A self-learning gate system that automatically adjusts for transit users, comprising one or more processors and one or more memories with computer code for:
  capturing first sensor data using one or more sensors for a first transit user;
  forming input data comprising the first sensor data;
  generating first control data using a machine learning model based on the first input data, wherein the first control data includes instructions for a desired movement of a barrier of a fare gate;
  sending the first control data to a barrier actuator to cause a desired movement of the barrier, wherein the barrier actuator is coupled to the barrier;
  determining actual movement of the barrier did not match the desired movement;
  forming training data based on a comparison between the desired movement of the barrier and the actual movement of the barrier;
  training the machine learning model using the training data;
  capturing second sensor data using the one or more sensors for a second transit user;
  forming second input data comprising the second sensor data; and
  generating second control data using the machine learning model based on the first input data, wherein the second control data is different from the first control data.

16. The self-learning gate system that automatically adjusts for transit users of claim 15, wherein the first input data further comprises fare ticket data for the first transit user.

17. The self-learning gate system that automatically adjusts for transit users of claim 15, wherein the first input data further comprises account information for the first transit user.

18. The self-learning gate system that automatically adjusts for transit users of claim 15, wherein determining the actual movement of the barrier includes:
  generating barrier data with a sensor coupled to the barrier actuator, wherein the barrier data is indicative of the actual movement of the barrier.

19. The self-learning gate system that automatically adjusts for transit users of claim 15, wherein the machine learning model further comprises a neural network.

20. The self-learning gate system that automatically adjusts for transit users of claim 15, where the second control data sent to the barrier actuator is torque limited after changes in the machine learning model.

\* \* \* \* \*